(12) United States Patent
Shin et al.

(10) Patent No.: US 9,094,679 B2
(45) Date of Patent: Jul. 28, 2015

(54) DISPLAY DEVICE

(75) Inventors: Kyoung Ju Shin, Hwaseong-si (KR); Seung-Hoon Lee, Hwaseong-si (KR)

(73) Assignee: Samsung Display Co., Ltd., Yongin, Gyeonggi-do (KR)

( * ) Notice: Subject to any disclaimer, the term of this patent is extended or adjusted under 35 U.S.C. 154(b) by 605 days.

(21) Appl. No.: 13/459,632

(22) Filed: Apr. 30, 2012

(65) Prior Publication Data

US 2013/0176520 A1    Jul. 11, 2013

(30) Foreign Application Priority Data

Jan. 9, 2012   (KR) .................... 10-2012-0002452

(51) Int. Cl.
   *G02F 1/1335*   (2006.01)
   *H04N 13/04*   (2006.01)
   *G02F 1/13363*   (2006.01)
   *G02B 27/26*   (2006.01)

(52) U.S. Cl.
   CPC ............ *H04N 13/0434* (2013.01); *G02B 27/26* (2013.01); *G02F 1/13363* (2013.01); *G02F 1/133528* (2013.01); *H04N 13/0454* (2013.01)

(58) Field of Classification Search
   USPC .................................................. 349/15, 117
   See application file for complete search history.

(56) References Cited

U.S. PATENT DOCUMENTS

| 5,956,001 | A * | 9/1999 | Sumida et al. ................... 345/55 |
| 7,486,341 | B2 | 2/2009 | Hong et al. |
| 2008/0080049 | A1 | 4/2008 | Hamagishi et al. |
| 2010/0265230 | A1 | 10/2010 | Kang |
| 2010/0289884 | A1 | 11/2010 | Kang |
| 2011/0128269 | A1 | 6/2011 | Lee et al. |
| 2013/0027621 | A1 | 1/2013 | Lee et al. |

FOREIGN PATENT DOCUMENTS

| JP | 09-149434 | 6/1997 |
| JP | 4087322 | 2/2008 |
| JP | 2009-181097 | 8/2009 |
| KR | 1020060032547 | 4/2006 |
| KR | 100852006 | 8/2008 |
| KR | 1020100051755 | 5/2010 |
| KR | 1020100080032 | 7/2010 |
| KR | 10-2013-0012780 | 2/2013 |

* cited by examiner

*Primary Examiner* — Lucy Chien
(74) *Attorney, Agent, or Firm* — F. Chau & Associates, LLC

(57) ABSTRACT

A display includes a display panel including a plurality of pixels, a polarizer disposed on a first side of the display panel, a phase retardation film disposed on the polarizer and glasses comprising a first eye glass portion and a second eye glass portion, wherein at least one of the plurality of pixels includes a first sub-pixel and a second sub-pixel, and the phase retardation film includes a first phase retardation portion corresponding to the first sub-pixel and a second phase retardation portion corresponding to the second sub-pixel.

24 Claims, 22 Drawing Sheets

| PXa | PXa | ... | PXb | PXb | ... | PXa | PXa | ... | PXb | PXb | ... | : | : | |

Left-eye

| PXa | PXa | ... | PXb | PXb | ... | PXa | PXa | ... | PXb | PXb | ... | : | : | |

Right-eye

FIG.10
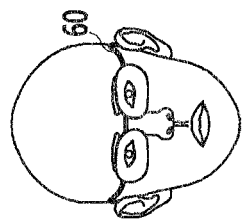
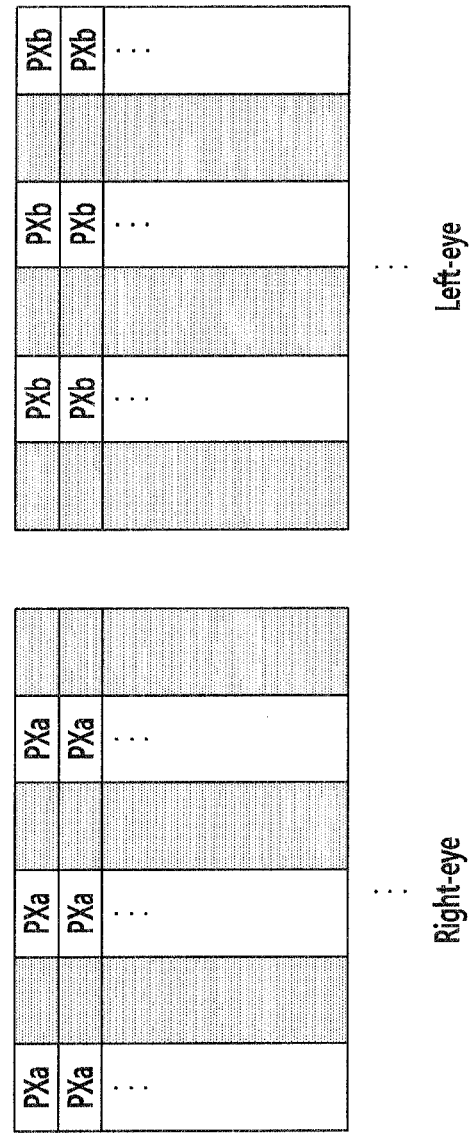

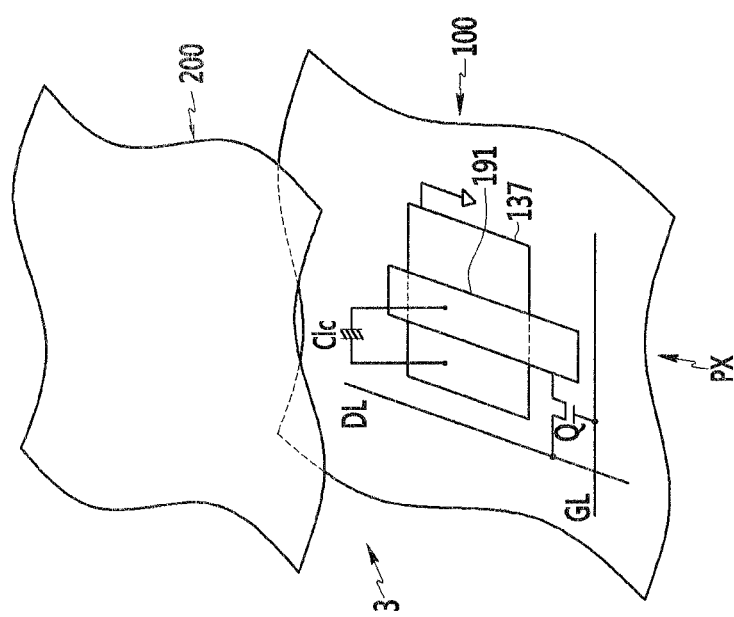

DISPLAY DEVICE

CROSS-REFERENCE TO RELATED APPLICATION

This application claims priority under 35 U.S.C. §119 to Korean Patent Application No. 10-2012-0002452 filed in the Korean Intellectual Property Office on Jan. 9, 2012, the disclosure of which is incorporated by reference herein in its entirety.

BACKGROUND

1. Technical Field

The present invention relates to a display device. More particularly, the present invention relates to a display that can display a three-dimensional image by using a patterned phase retardation film.

2. Discussion of the Related Art

In general, a three dimensional (3D) image display technique allows a viewer to feel the depth (e.g., a 3D effect) of an object by using binocular parallax. Binocular parallax may exist due to the eyes of a person being spaced apart from each other by a predetermined distance, and thus, a two dimensional (2D) image seen by the left eye is different from that seen by the right eye. Thus, the person's brain blends the two different 2D images together to generate a 3D image that is a perspective and realistic representation of the object being viewed.

Techniques for displaying 3D images, which use binocular parallax, may include a stereoscopic method and an autostereoscopic method. The stereoscopic method uses glasses such as shutter glasses and polarized glasses, and the autostereoscopic method does not use glasses, but instead arranges a lenticular lens, a parallax barrier, and/or other units in a display.

In the stereoscopic method using polarized glasses, a 3D image display is used in which light of an image of the display is polarized by attaching a patterned phase retardation film to the display and the left eye and the right eye are set to recognize different images through a polarizer in the polarized glasses such that a 3D image can be seen. In this case, however, the 3D image display displays the left eye image and the right eye image together such that the resolution of the 3D image may be deteriorated compared to that of a 2D image.

SUMMARY

An exemplary embodiment of the present invention provides a display device having improved resolution when displaying a three dimensional (3D) image by using a patterned phase retardation film.

An exemplary embodiment of the present invention also provides a display device that reduces crosstalk between the left eye and the right eye when displaying a 3D image by using a patterned phase retardation film.

A display according to an exemplary embodiment of the present invention includes: a display panel including a plurality of pixels; a polarizer disposed on a first side of the display panel; a phase retardation film disposed on the polarizer; and glasses including a first eye glass portion and a second eye glass portion. At least one of the plurality of pixels includes a first sub-pixel and a second sub-pixel, and the phase retardation film includes a first phase retardation portion corresponding to the first sub-pixel and a second phase retardation portion corresponding to the second sub-pixel.

In a two dimensional (2D) image display mode, the first sub-pixel and the second sub-pixel included in a first pixel may respectively receive a data voltage, wherein the data voltages are based on different gamma curves and the same input image signal, and, in a 3D image display mode, the first sub-pixel of the first pixel may display a first image recognizable through the first eye glass portion, and the second sub-pixel of the first pixel may display a second image recognizable through the second eye glass portion.

In the 3D image display mode, the first sub-pixel and the second sub-pixel included in the first pixel may respectively receive a data voltage, wherein the data voltages are based on the same gamma curve and the same input image signal.

A length of the first pixel in a first direction may be longer than a length of the first pixel in a second direction that is perpendicular to the first direction, and the first sub-pixel and the second sub-pixel included in the first pixel may be arranged neighboring each other in the first direction.

The first sub-pixels included in pixels neighboring each other in the second direction may be arranged along the second direction to form a first sub-pixel column, and the second sub-pixels included in pixels neighboring each other in the second direction may be arranged along the second direction to form a second sub-pixel column.

The first sub-pixel column and the second sub-pixel column may be alternately arranged along the first direction.

The first phase retardation portion may correspond to the first sub-pixels of one first sub-pixel column, and the second phase retardation portion may correspond to the second sub-pixels of one second sub-pixel column.

The first phase retardation portion and the second phase retardation portion may respectively include a quarter-wave plate, and the first phase retardation portion and the second phase retardation portion may change light that has passed through the polarizer to light that is circularly polarized in first and second different directions, respectively.

The first eye glass portion may transmit the light that has passed through the first phase retardation portion, and the second eye glass portion may transmit the light that has passed through the second phase retardation portion.

The first sub-pixels included in two pixel columns neighboring each other in the first direction may be adjacent to each other, and the second sub-pixels included in two pixel columns neighboring each other in the first direction may be adjacent to each other.

The first phase retardation portion may correspond to the first sub-pixels included in the two pixel columns neighboring each other in the first direction, and the second phase retardation portion may correspond to the second sub-pixels included in the two pixel columns neighboring each other in the first direction.

A display according to an exemplary embodiment of the present invention includes: a display panel including a plurality of pixels; a polarizer disposed on a first side of the display panel; a phase retardation film disposed on the polarizer; and glasses including a first eye glass portion and a second eye glass portion. The plurality of pixels include a plurality of first pixels configured to display a right eye image and a plurality of second pixels configured to display a left eye image, the plurality of first pixels form a plurality of first pixel columns respectively including pixels arranged in a first direction, the plurality of second pixels form a plurality of second pixel columns respectively including pixels arranged in the first direction, two of the first pixel columns and two of the second pixel columns are alternately arranged along a second direction that is perpendicular to the first direction, and the phase retardation film includes a first phase retardation portion corresponding to the two first pixel columns neighboring each other and a second phase retardation portion corresponding to the two second pixel columns neighboring each other.

The first phase retardation portion and the second phase retardation portion may respectively include a quarter-wave plate, and the first phase retardation portion and the second phase retardation portion may change light that has passed through the polarizer to light circularly that is polarized in first and second different directions, respectively.

The first eye glass portion may transmit the light that has passed through the first phase retardation portion and the second eye glass portion may transmit the light that has passed through the second phase retardation portion.

A display according to an exemplary embodiment of the present invention includes: a display panel including a plurality of pixels; a polarizer disposed on a display side of the display panel; and a phase retardation film disposed on the polarizer, wherein the phase retardation film includes a first portion overlapping a plurality of first sub-pixels arranged adjacent to each other in a first direction and a second portion overlapping a plurality of second sub-pixels arranged adjacent to each other in the first direction.

BRIEF DESCRIPTION OF THE DRAWINGS

FIG. 10 shows images recognized by the left eye and the right eye of an observer through glasses when viewing a 3D image displayed by a display device according to an exemplary embodiment of the present invention;

FIG. 20, FIG. 21, and FIG. 22 respectively show equivalent circuit diagrams of a pixel of a display panel according to an exemplary embodiment of the present invention.

DETAILED DESCRIPTION OF THE EMBODIMENTS

Figure 1:
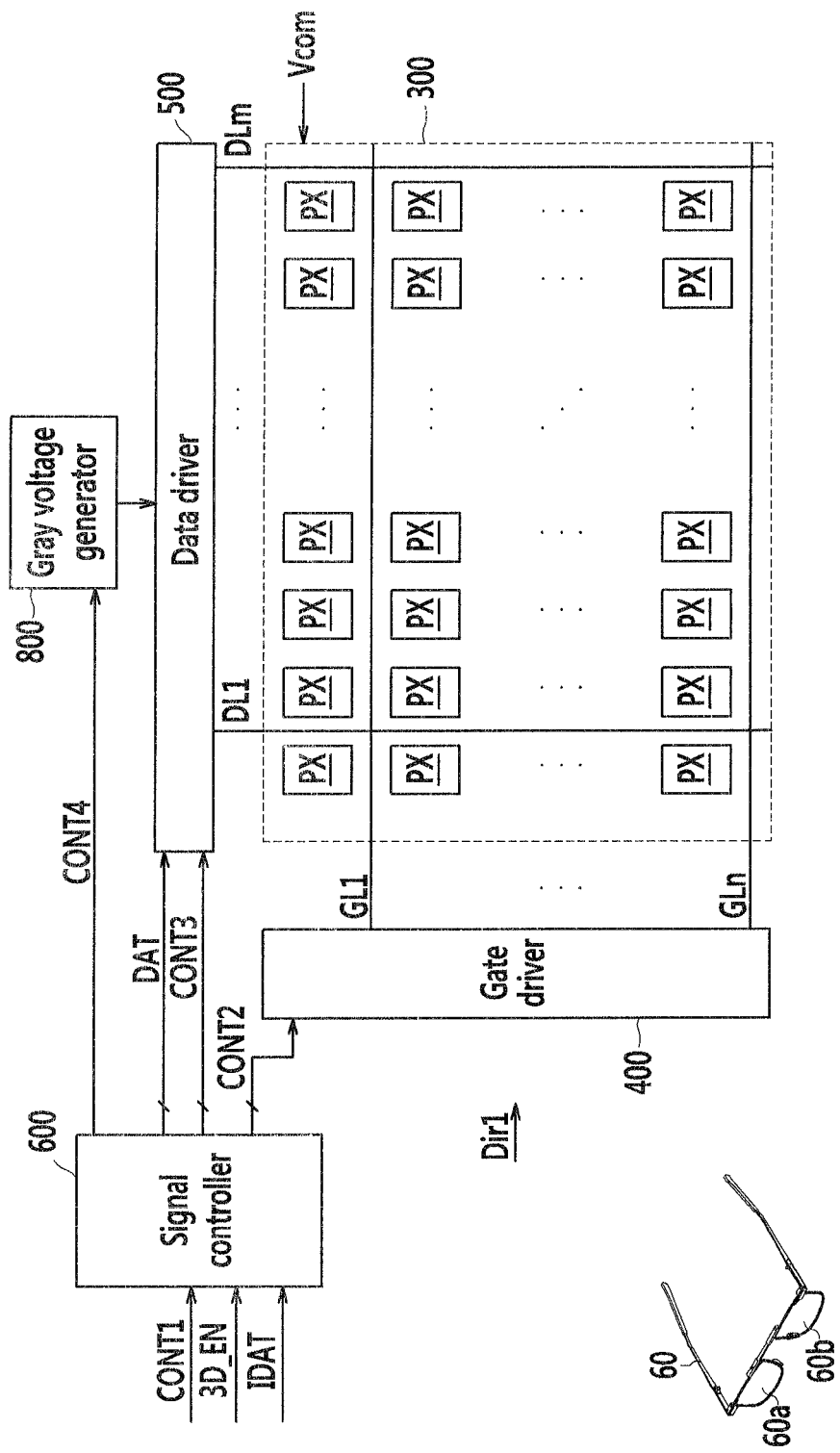
FIG. 1 is a block diagram of a display device according to an exemplary embodiment of the present invention.

Exemplary embodiments of the present invention will be described more fully hereinafter with reference to the accompanying drawings. However, the present invention may be embodied in various different ways and should not be construed as limited to the embodiments disclosed herein.

In the drawings, the thicknesses of layers, films, panels, regions, etc., may be exaggerated for clarity. Like reference numerals may designate like elements throughout the specification and drawings. It will be understood that when an element such as a layer, film, region, or substrate is referred to as being "on" another element, it can be directly on the other element or intervening elements may also be present.

First, a display device according to an exemplary embodiment of the present invention will be described with reference to FIG. 1.

FIG. 1 is a block diagram of a display device according to an exemplary embodiment of the present invention. Hereinafter, the display device may be referred to as a display.

The display device according to the exemplary embodiment of the present invention selectively displays a two-dimensional (2D) image or a three-dimensional (3D) image, or displays only a 3D image according to a mode. The display device may be various displays such as a plasma display panel (PDP), a liquid crystal display (LCD), an organic light emitting diode display (OLED), etc.

Referring to FIG. 1, the display device according to the exemplary embodiment of the present invention includes a display panel 300 for displaying an image, a gate driver 400, a data driver 500, a gray voltage generator 800 connected to the data driver 500, a signal controller 600, and glasses 60 that are used so that an observer may recognize a 3D image.

The display panel 300 includes a plurality of display signal lines and a plurality of pixels PX respectively connected to the plurality of display signal lines and approximately arranged in a matrix format. The pixels PX will be described in detail later.

The display signal lines include a plurality of gate lines GL1 to GLn for transmitting a gate signal (also referred to as a scanning signal) and a plurality of data lines DL1 to DLm for transmitting a data signal. The plurality of gate lines GL1 to GLn may extend in a first direction Dir1, in other words, a row direction, and the plurality of data lines DL1 to DLm may extend in a column direction that is approximately perpendicular to the first direction Dir1.

Each pixel PX may include a switching element (not shown) such as a thin film transistor connected to a corresponding gate line (e.g., one of GL1 to GLn) and a corresponding data line (e.g., one of DL1 to DLm), and a pixel electrode (not shown).

The signal controller 600 controls an operation of the gate driver 400, the data driver 500, and the gray voltage generator 800.

The signal controller 600 receives an input image signal IDAT, an input control signal CONT1 for controlling display of the input image signal IDAT, and a 3D enable signal 3D_EN from an external graphics controller (not shown). The input image signal IDAT includes luminance information of each pixel PX, and the luminance may have a predetermined number of grays, for example, $1024=2^{10}$, $256=2^8$, or $64=2^6$ grays. The input control signal CONT1 may include a vertical synchronization signal Vsync, a horizontal synchronization signal Hsync, a main clock signal MCLK, a data enable signal DE, and the like.

The signal controller 600 may operate in a 3D image display mode or a 2D image display mode according to the 3D enable signal 3D_EN.

According to a determined display mode, the signal controller 600 processes the input image signal IDAT according to an operation condition of the display panel 300 based on the input image signal IDAT and the input control signal CONT1, generates a gate control signal CONT2, a data control signal CONT3, and a gray voltage control signal CONT4, transmits the gate control signal CONT2 to the gate driver 400, transmits the data control signal CONT3 and the processed image signal DAT (also referred to as a digital image signal) to the data driver 500, and outputs the gray voltage control signal CONT4 to the gray voltage generator 800.

The gate driver 400 is connected to the gate lines GL1 to GLn. The gate driver 400 applies a gate signal formed of a combination of a gate-on voltage Von and a gate-off voltage Voff to the gate lines GL1 to GLn. The gate driver 400 may turn on a switching element (not shown) connected to the gate lines GU to GLn by applying the gate-on voltage Von to the gate lines GL1 to GLn according to the gate control signal CONT2 transmitted from the signal controller 600. Thus, the data voltage applied to the data lines DL1 to DLm is applied to the corresponding pixel. PX through the turned-on switching element (not shown).

The gray voltage generator 800 may generate a reference gray voltage that includes all of the gray voltages or a limited number of gray voltages by receiving gamma data (also referred to as a gamma curve) from the signal controller 600.

The data driver 500 receives the data control signal CONT3 and the digital image signal DAT from the signal controller 600, and generates a gray voltage with respect to all of the grays by selecting a data voltage among the gray voltages received from the gray voltage generator 800 or dividing a reference gray voltage received from the gray voltage generator 800 and then selects a data voltage therefrom. The data driver 500 applies the corresponding data voltage to the data lines DL1 to DLm of the display panel 300.

The glasses 60 include a right eye lens portion 60a and a left eye glasses portion 60b, and are used by a user when the display panel 300 displays a 3D image. The right eye lens portion 60a and the left eye glasses portion 60b may transmit images respectively displayed by different pixels PX or different sub-pixels. In FIG. 1, the right eye lens portion 60a and the left eye glasses portion 60b may be interchanged with each other.

A detailed structure of the display according to the exemplary embodiment of the present invention will now be described with reference to FIG. 1, FIG. 2, FIG. 3, FIG. 4, FIG. 5, and FIG. 6.

Figure 2:
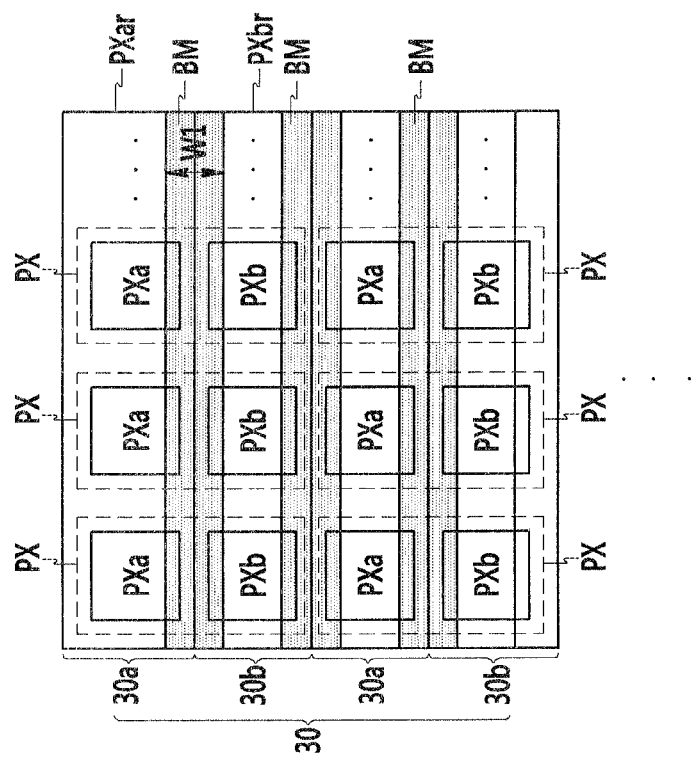
FIG. 2 and FIG. 3 respectively show top plan views of a display panel of a display device according to an exemplary embodiment of the present invention.
Figure 3:
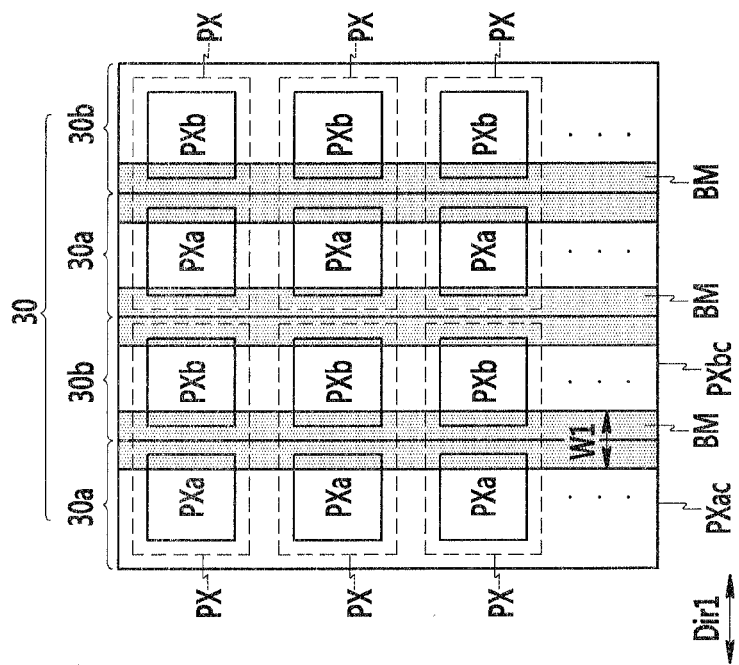
Figure 4:
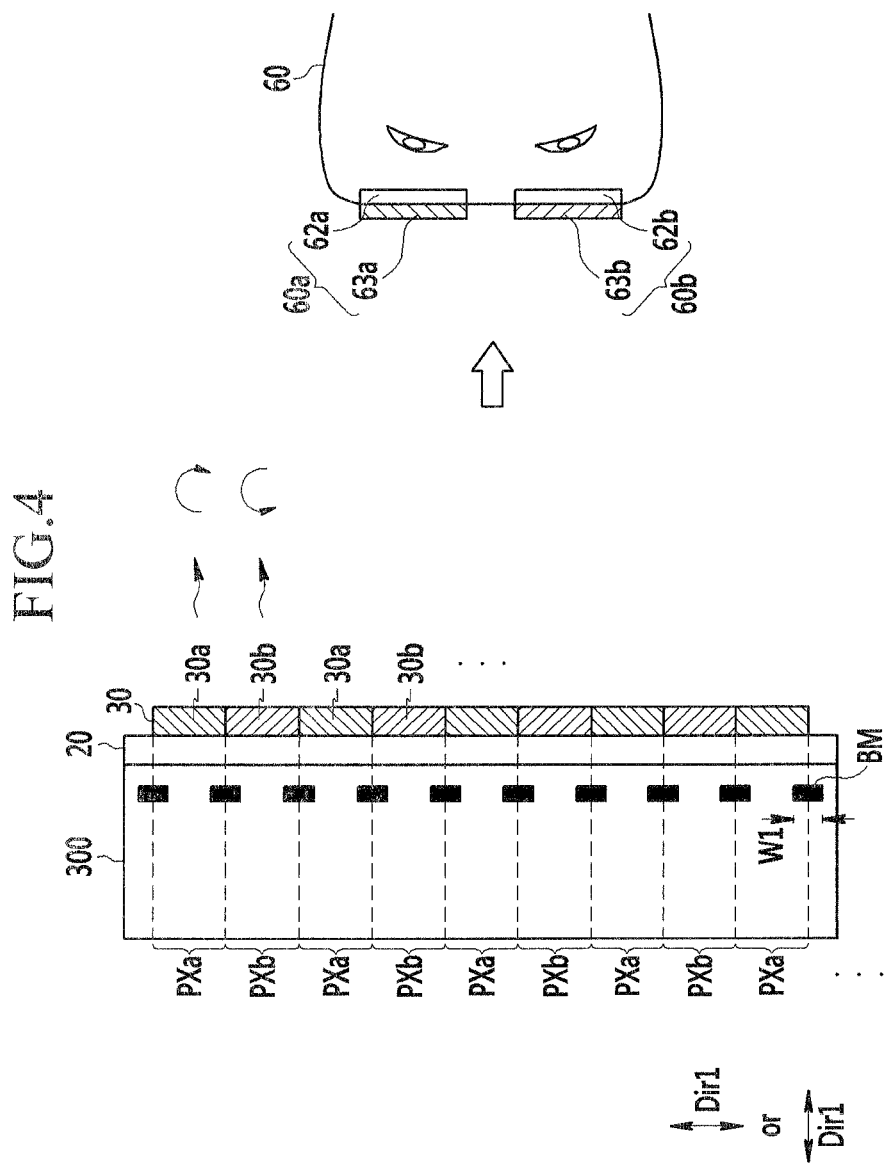
FIG. 4 and FIG. 5 respectively show cross-sectional views of a display device according to an exemplary embodiment of the present invention.
Figure 5:
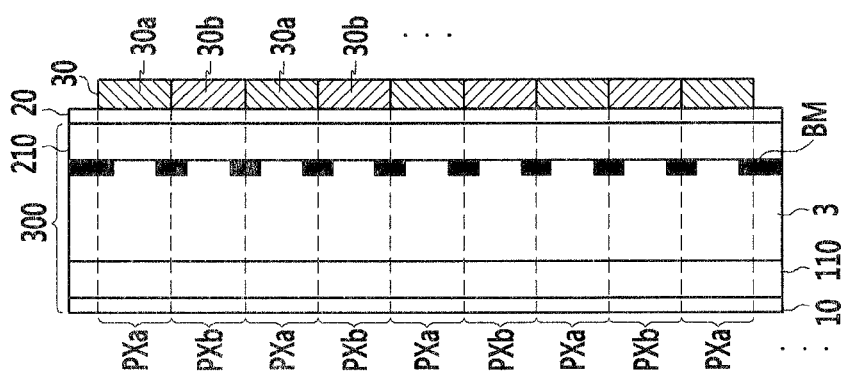
Figure 6:
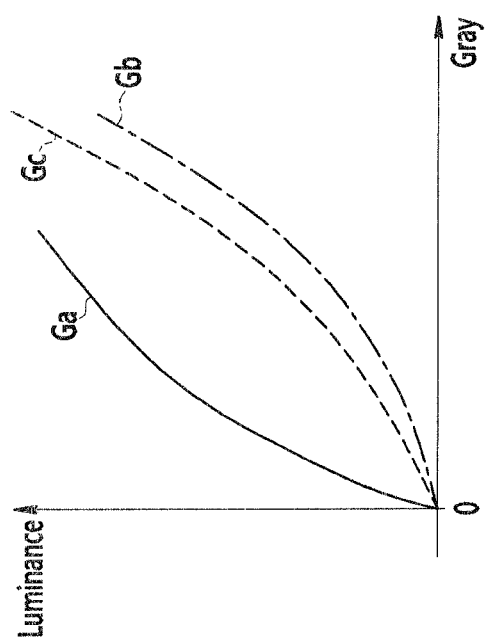
FIG. 6 is a graph illustrating an example of a gamma curve when displaying a two-dimensional (2D) image and an example of a gamma curve when displaying a three-dimensional (3D) image in a display device according to an exemplary embodiment of the present invention.

FIG. 2 and FIG. 3 respectively show top plan views of a display panel of a display according to an exemplary embodiment of the present invention, FIG. 4 and FIG. 5 respectively show cross-sectional views of a display according to an exemplary embodiment of the present invention, and FIG. 6 is a graph illustrating an example of a gamma curve when displaying a 2D image and a gamma curve when displaying a 3D image in a display according to an exemplary embodiment of the present invention.

Referring to FIG. 2 and FIG. 3, each pixel PX of the display panel 300 may include a first sub-pixel PXa and a second sub-pixel PXb.

In the 2D image display mode, the two sub-pixels PXa and PXb may respectively display images by receiving data voltages depending on different gamma curves with respect to one input image signal IDAT for the corresponding pixel PX. FIG. 6 exemplarily illustrates two gamma curves Ga and Gb for the two sub-pixels PXa and PXb. Thus, the two sub-pixels PXa and PXb may express a different luminance for the same gray of the input image signal IDAT and may improve visibility of the display. In this case, the gray voltage generator 800 can generate two gray voltage sets (or, two reference gray voltage sets) related to a transmittance of the pixel PX. The two (reference) gray voltage sets may be independently provided to the two sub-pixels PXa and PXb forming one pixel PX.

In the 3D image display mode, the two sub-pixels PXa and PXb may respectively display a left eye image and a right eye image. In this case, the first sub-pixel PXa may display the left eye image and the second sub-pixel PXb may display the right eye image, or vice versa. The two data voltages applied to the two sub-pixels PXa and PXb may depend on one gamma curve. FIG. 6 exemplarily illustrates one gamma curve Gc with respect to two sub-pixels PXa and PXb. The gamma curve Gc may be a curve obtained by combining two gamma curves Ga and Gb with respect to two sub-pixels PXa and PXb in the 2D mode.

Referring back to FIG. 2 and FIG. 3, the first and second sub-pixels PXa and PXb of each pixel PX may have a constant positional relationship. For example, a left and right positional relationship or an upper and lower positional relationship of the first and second sub-pixels PXa and PXb in each pixel PX may be substantially equal to each other in the respective pixels PX.

Referring to FIG. 2, the first sub-pixel PXa and the second sub-pixel PXb included in each pixel. PX may be arranged in a column direction. Thus, a plurality of first sub-pixels PXa of one pixel PX row (hereinafter referred to as a pixel row) may form a first sub-pixel PXa row (hereinafter referred to as a first sub-pixel row PXar), and a plurality of second sub-pixels PXb may form a second sub-pixel PXb row (hereinafter referred to as a second sub-pixel row PXbr). The first sub-pixel row PXar and the second sub-pixel row PXbr may be alternately arranged in the column direction.

Referring to FIG. 3, a first sub-pixel PXa and a second sub-pixel PXb included in each pixel PX may be arranged in a row direction. Thus, a plurality of first sub-pixels PXa of one pixel PX column (hereinafter referred to as a pixel column) may form a first sub-pixel PXa column (hereinafter referred to as a first sub-pixel column PXac) and a plurality of second sub-pixels PXb may form a second sub-pixel PXb column (hereinafter referred to as a second sub-pixel column PXbc). The first sub-pixel column PXac and the second sub-pixel column PXbc may be alternately arranged in a row direction.

In the case of the exemplary embodiment shown in FIG. 2, a column direction (or, a vertical direction) length of one pixel PX may be longer than a row direction (or, a horizontal direction) length of the one pixel PX. In the case of the exemplary embodiment shown in FIG. 3, the row direction length of one pixel PX may be longer than the column direction length of the one pixel PX. In the exemplary embodiments shown in FIG. 2 and FIG. 3, positions of the first and second sub-pixels PXa and PXb in each pixel PX may be interchanged with each other, and this may be applied to all pixels PX.

Referring to FIG. 2 to FIG. 5, the display panel 300 may further include a light blocking member BM corresponding to a neighboring pixel PX or neighboring sub-pixels PXa and PXb. In the exemplary embodiment shown in FIG. 2, the light blocking member BM includes a portion disposed between neighboring first and second sub-pixel rows PXar and PXbr, and the light blocking member BM of the exemplary embodiment shown in FIG. 3 may include a portion disposed between neighboring first and second sub-pixel columns PXac and PXbc. In this case, the light blocking member BM disposed between the neighboring first and second sub-pixel rows PXar and PXbr or the light blocking member BM disposed between the neighboring first and second sub-pixel columns PXac and PXbc may have a constant width W1.

Referring to FIG. 2 to FIG. 5, the display according to the exemplary embodiment of the present invention may further include a polarizer 20 disposed on a display side of the display panel 300, in other words, a side facing the glasses 60, and a phase retardation film 30 disposed on the polarizer 20.

The polarizer 20 has a transmissive axis in a second direction so that the polarizer 20 can transmit light polarized in the second direction and absorb light polarized in a direction perpendicular to the second direction.

As a patterned phase retardation film, the phase retardation film 30 includes a plurality of first phase retardation portions 30a and a plurality of second phase retardation portions 30b alternately arranged in a row or column direction.

The first phase retardation portion 30a may correspond to the first sub-pixel row PXar and the second phase retardation portion 30b may correspond to the second sub-pixel row PXbr. On the contrary, the first phase retardation portion 30a may correspond to the second sub-pixel row PXbr and the second phase retardation portion 30b may correspond to the first sub-pixel row PXar.

In the exemplary embodiment shown in FIG. 2, each of the first and second phase retardation portions 30a and 30b may be extended in a row direction, and the first and second phase retardation portions 30a and 30b may be alternately arranged in a column direction. In this case, one phase retardation portion 30a or 30b may be correspondingly disposed in each sub-pixel row PXar or PXbr. In other words, a pitch of the first and second phase retardation portions 30a and 30b may be substantially equivalent to a pitch of the first and second sub-pixel rows PXar and PXbr.

In the exemplary embodiment shown in FIG. 3, each of the first and second phase retardation portions 30a and 30b may extend in a column direction and the first and second phase retardation portions 30a and 30b may be alternately arranged in a row direction. In this case, one phase retardation portion 30a or 30b may be correspondingly disposed in each sub-pixel column PXac or PXbc. In other words, a pitch of the first and second phase retardation portions 30a and 30b may be substantially equivalent to a pitch of the first and second sub-pixel columns PXac and PXbc.

The first phase retardation portion 30a and the second phase retardation portion 30b may respectively clockwise polarize and counter-clockwise polarize light that was linearly polarized by passing through the polarizer 20. For example, light generated from the first sub-pixels PXa corresponding to the first phase retardation portion 30a may pass through the polarizer 20 and the first phase retardation portion 30a and thus may be clockwise polarized, and light generated from the second sub-pixels PXb corresponding to the second phase retardation portion 30b may pass through the polarizer 20 and the second phase retardation portion 30b and thus may be counter-clockwise polarized. On the contrary, light generated from the first sub-pixels PXa corresponding to the first phase retardation portion 30a may pass through the polarizer 20 and the first phase retardation portion 30a and thus may be counter-clockwise polarized, and light generated from the second sub-pixels PXb corresponding to the second phase retardation portion 30b may pass through the polarizer 20 and the second phase retardation portion 30b and thus may be clockwise polarized.

The first phase retardation portion 30a and the second phase retardation portion 30b may be quarter-wave plates (also referred to as λ/4 plates) that can change the phase of incident light by ¼ wavelength. In this case, the first phase retardation portion 30a and the second phase retardation portion 30b may have different slow axes.

The glasses 60 are provided to be worn by an observer to recognize a 3D image in the 3D image display mode.

Referring to FIG. 4, the right eye lens portion 60a transmits light that has passed through the first phase retardation portion 30a and blocks light that has passed through the second phase retardation portion 30b. In addition, the left eye lens portion 60b transmits light that has passed through the second phase retardation portion 30b and blocks light that has passed through the first phase retardation portion 30a. In the alternative, light transmitted by the right eye lens portion 60a and the left eye lens portion 60b may be opposite to the above description.

For example, the right eye lens portion 60a of the glasses 60 may include a phase retardation film 63a disposed toward the display panel 300 and a polarizer 62a disposed toward the eyes of the observer, and the left eye lens portion 60b may include a phase retardation film 63b disposed toward the display panel 300 and a polarizer 62b disposed toward the eyes of the observer. The phase retardation films 63a and 63b may respectively linearly polarize the clockwise polarized light and the counter-clockwise polarized light. The phase retardation films 63a and 63b may be quarter-wave plates. The linearly polarized light may be selectively passed through the polarizers 62a and 62b depending on its polarization direction, and may be recognized by the eyes of the observer. The right eye lens portion 60a and the left eye lens portion 60b may be interchanged with each other.

The phase retardation film 30, the phase retardation film 63a, and the phase retardation film 63b may include an anisotropic material that may cause birefringence, or a material that functions the same.

The light blocking member BM prevents not only light leakage between pixels PX but also crosstalk that causes a left eye image and a right eye image to be mixed depending on a viewing angle in the 3D image display mode. For this, the light blocking member BM may have a width that is equal to or greater than the constant width W1 between neighboring first and second sub-pixels PXa and PXb.

The exemplary embodiment shown in FIG. 5 is almost equivalent to the exemplary embodiment shown in FIG. 4, except that the display is a liquid crystal display.

Referring to FIG. 5, a display according to an exemplary embodiment of the present invention may include a lower substrate 110 and an upper substrate 210 that face each other, and a liquid crystal layer 3 disposed between the lower and upper substrates 110 and 210. The liquid crystal layer 3 has dielectric anisotropy, and may be aligned in a vertical alignment (VA) mode during which the liquid crystal layer 3 is arranged perpendicularly to the sides of the substrates 110 and 210. The light blocking member BM may be disposed in the upper substrate 210, or it may be disposed in the lower substrate 110. A polarizer 10 may be attached to an outer side of the lower substrate 110, and the polarizer 20 and the phase retardation film 30 may be sequentially attached to an outer side of the upper substrate 210. A transmissive axis of the polarizer 10 may be parallel with a transmissive axis of the polarizer 20 or may form a specific angle with the transmissive axis of the polarizer 20.

A 2D and 3D image displaying method of the displays described above will now be described with reference to FIG. 7, FIG. 8, FIG. 9, and FIG. 10, together with the above-described drawings.

Figure 7:
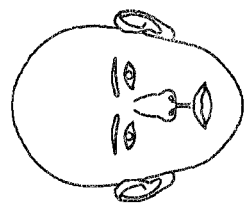
FIG. 7 shows an image recognized by the left eye and the right eye of an observer through glasses when viewing a 2D image displayed by a display device according to an exemplary embodiment of the present invention.
Figure 8:
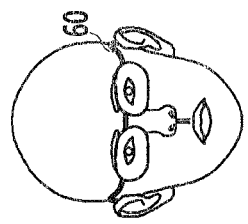
FIG. 8 shows images recognized by the left eye and the right eye of an observer through glasses when viewing a 3D image displayed by a display device according to an exemplary embodiment of the present invention.
Figure 9:
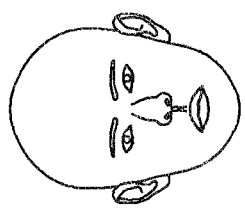
FIG. 9 shows images recognized by the left eye and the right eye of an observer through glasses when viewing a 2D image displayed by a display device according to an exemplary embodiment of the present invention.

FIG. 7 shows an image recognized by the left eye and the right eye of an observer through the glasses 60 when a 2D image is displayed by a display device according to an exemplary embodiment of the present invention, FIG. 8 shows an image recognized by the left eye and the right eye of an observer through the glasses 60 when a 3D image is displayed by a display device according to an exemplary embodiment of the present invention, FIG. 9 shows an image recognized by the left eye and the right eye of an observer through the glasses 60 when a 2D image is displayed by a display device according to an exemplary embodiment of the present invention, and FIG. 10 shows an image recognized by the left eye and the right eye of an observer through the glasses 60 when a 3D image is displayed by a display device according to an exemplary embodiment of the present invention.

FIG. 7 and FIG. 8 show images recognized by the left eye and the right eye of an observer through the glasses 60 in a case that an alignment and a structure of the pixels PX of a display according to an exemplary embodiment of the present invention correspond to the above-described exemplary embodiment shown in FIG. 2, and FIG. 9 and FIG. 10 show images recognized by the left eye and the right eye of an observer through the glasses 60 in a case that an alignment and a structure of the pixels PX of a display according to an exemplary embodiment of the present invention correspond to the above-described exemplary embodiment shown in FIG. 3.

Referring to FIG. 7 and to FIG. 9, in a 2D image display mode, the left eye and the right eye recognize images displayed by first sub-pixels PXa and the second sub-pixels PXb included in the pixels PX of the display panel 300. Thus, the left eye and the right eye recognize the same image, and the observer can view a 2D image. In this case, as previously described, two sub-pixels PXa and PXb included in one pixel PX respectively display an image by receiving data voltages depending on different gamma curves with respect to one input image signal IDAT so that visibility can be improved.

Referring to FIG. 8 and to FIG. 10, in a 3D image display mode, the left eye and the right eye recognize images displayed by different sub-pixels PXa and PXb. For example, the right eye recognizes a right-eye image displayed by the first sub-pixel PXa and the left eye recognizes a left eye image displayed by the second sub-pixel PXb. On the contrary, the first sub-pixel PXa may display a left eye image and the second sub-pixel PXb may display a right eye image. Thus, the observer can recognize a 3D image by the right eye image and the left eye image.

As described, one pixel PX displaying an image corresponding to one input image signal IDAT includes at least two sub-pixels PXa and PXb, and in the 2D image display mode, the two sub-pixels PXa and PXb display images according to different gamma curves such that visibility can be improved, and in the 3D image display mode, the two sub-pixels PXa and PXb display the right eye image and the left eye image. Further, in the 3D image display mode, one pixel PX can display an image corresponding to one input image signal IDAT so that resolution in the 3D image display mode can be prevented from being deteriorated compared to resolution in the 2D image display mode.

An example of the pixel PX of a display according to an exemplary embodiment of the present invention will now be described in further detail with reference to FIG. 11, FIG. 12, FIG. 13, FIG. 14, and FIG. 15.

FIG. 11, FIG. 12, FIG. 13, FIG. 14, and FIG. 15 are equivalent circuit diagrams of a pixel of a display device according to exemplary embodiments of the present invention.

Figure 11:
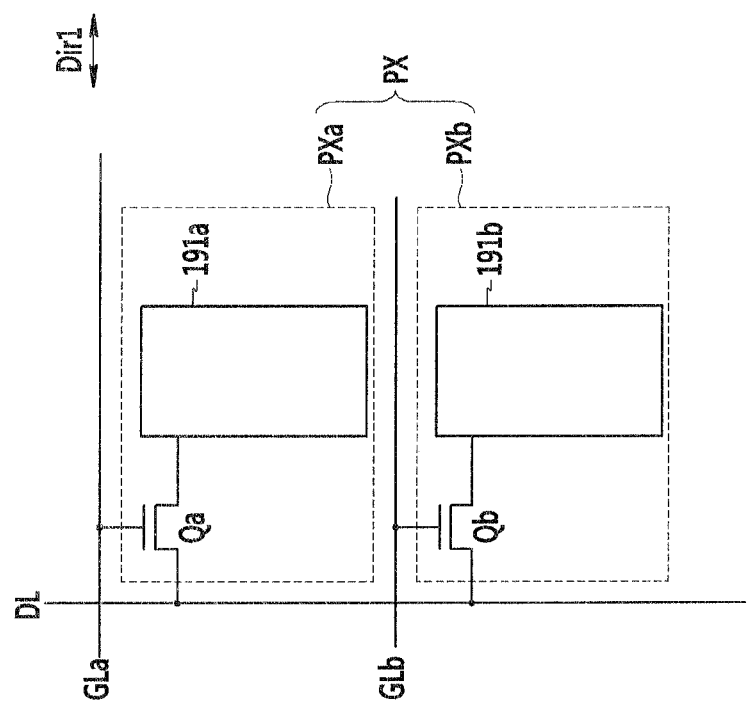
FIG. 11, FIG. 12, FIG. 13, FIG. 14, and FIG. 15 are equivalent circuit diagrams of a pixel of a display device according to exemplary embodiments of the present invention.

Referring to FIG. 11, a display according to an exemplary embodiment of the present invention includes a plurality of pairs of gate lines GLa and GLb, a plurality of data lines DL, and a plurality of pixels PX connected thereto.

Each pixel PX includes a pair of sub-pixels PXa and PXb, and the sub-pixels PXa and PXb respectively include switching elements Qa and Qb and sub-pixel electrodes 191a and 191b connected thereto.

The gate lines GLa and GLb may be extended in a first direction Dir1, in other words, a row direction, and the data line DL may be extended crossing the gate lines GLa and GLb.

As three-terminal elements, control terminals of the switching elements Qa and Qb are connected to the gate lines GLa and GLb, input terminals are connected to the data line DL, and output terminals are connected to the sub-pixel electrodes 191a and 191b.

The first sub-pixel electrode 191a and the second sub-pixel electrode 191b included in one pixel PX may be arranged in a direction perpendicular to the first direction Dir1. In other words, the first sub-pixel electrode 191a and the second sub-pixel electrode 191b may be arranged to neighbor each other in the column direction.

Figure 12:
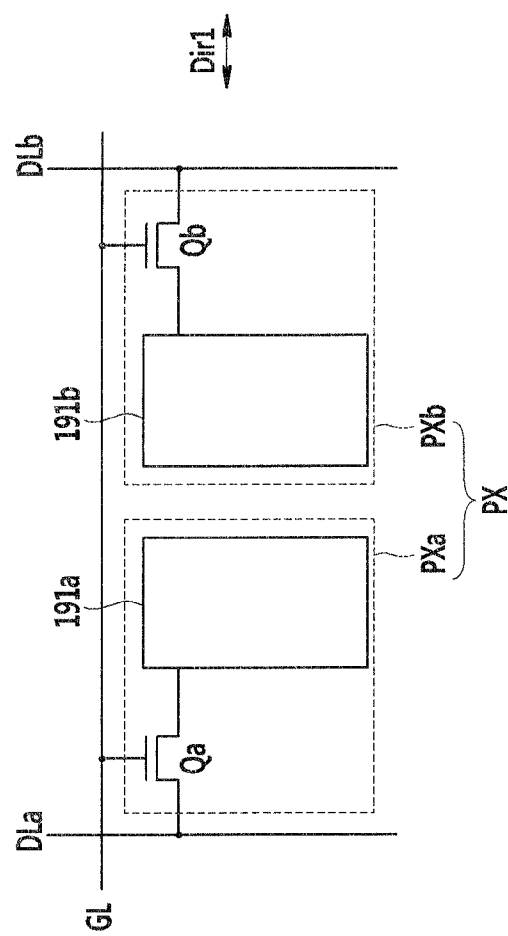

Referring to FIG. 12, a display according to an exemplary embodiment of the present invention includes a plurality of gate lines GL, a plurality of pairs of data lines DLa and DLb, and a plurality of pixels PX connected thereto.

Each pixel PX includes a pair of sub-pixels PXa and PXb, and the sub-pixels PXa and PXb respectively include switching elements Qa and Qb whose control terminals are connected to the corresponding gate line GL, input terminals are connected to the corresponding data lines DLa and DLb and output terminals are connected to sub-pixel electrodes 191a and 191b.

The first sub-pixel electrode 191a and the second sub-pixel electrode 191b included in one pixel PX may be arranged in a first direction Dir1. In other words, the first sub-pixel electrode 191a and the second sub-pixel electrode 191b may be arranged to neighbor each other in a row direction.

In the exemplary embodiments shown in FIG. 11 and FIG. 12, the gate lines GL, GLa, and GLb may extend in the first direction Dir1, in other words, the row direction, and the data lines DL, DLa, and DLb may extend to cross the gate lines GL, GLa and GLb. In addition, the first sub-pixel electrode 191a and the second sub-pixel electrode 191b may respectively receive data voltages depending on different gamma data as described above.

Figure 13:
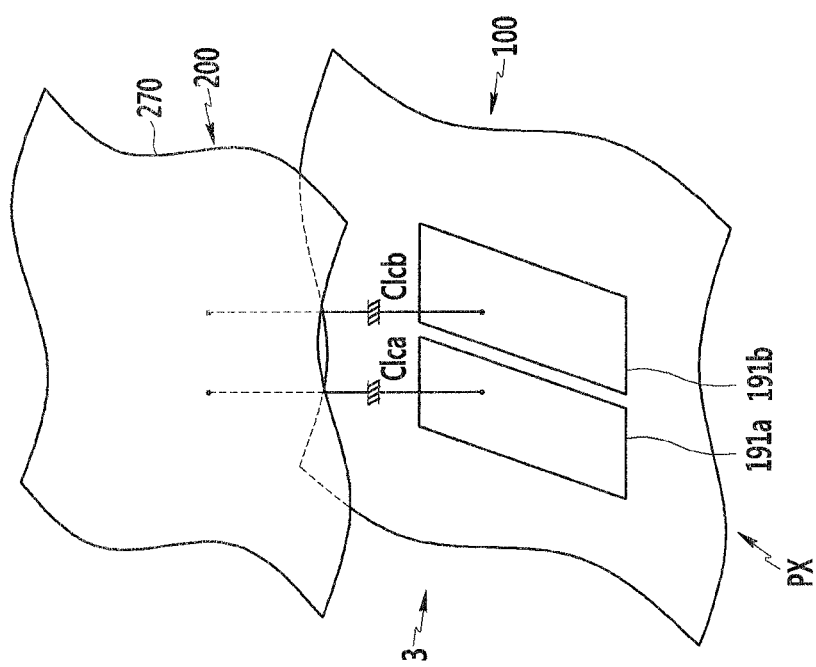
Figure 14:
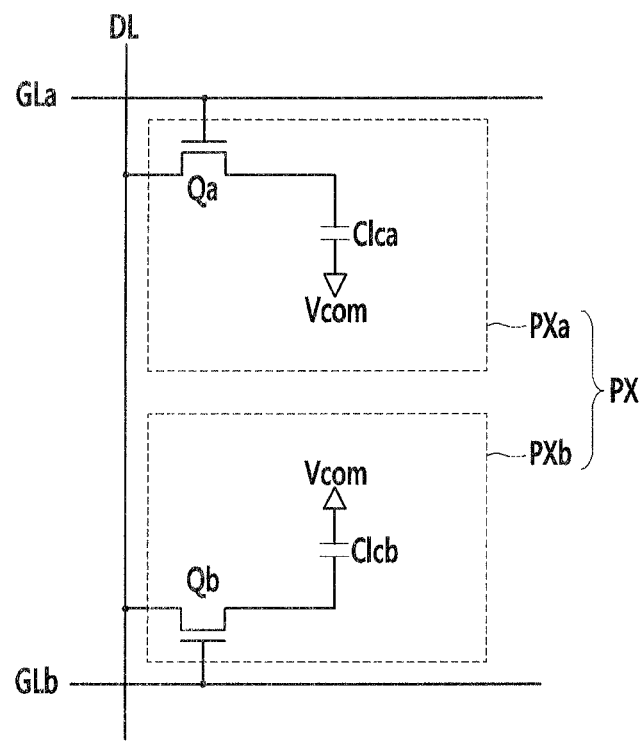
Figure 15:
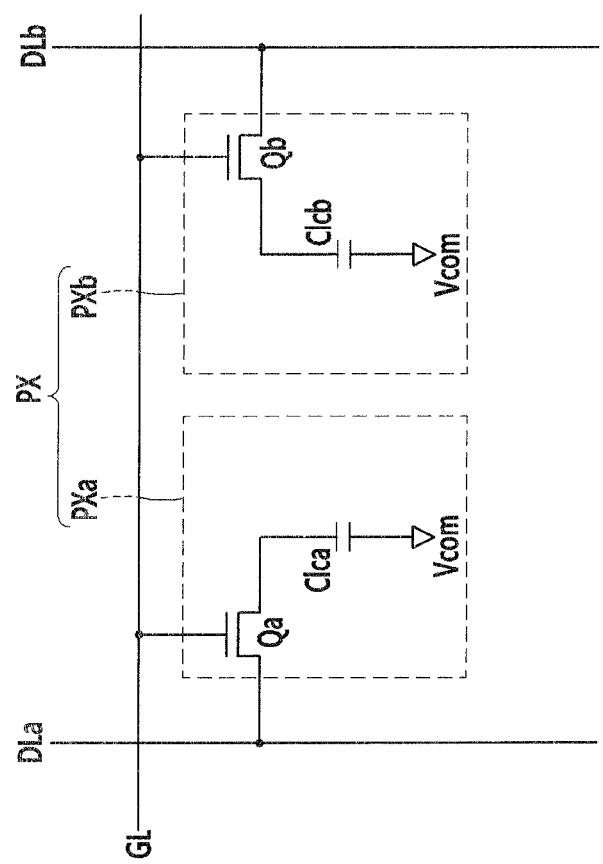

FIG. 13, FIG. 14, and FIG. 15 respectively show that a display according to an exemplary embodiment of the present invention as a liquid crystal display.

Referring to FIG. 13 to FIG. 15, a liquid crystal display according to the exemplary embodiment of the present invention includes lower and upper display panels 100 and 200 facing each other, and a liquid crystal layer 3 provided therebetween. The first sub-pixel electrode 191a and the second sub-pixel electrode 191b may be provided in the lower display panel 100, and an opposite electrode 270 that can receive a common voltage Vcom may be provided in the upper display panel 200. The first and second sub-pixel electrodes 191a and 191b and the opposite electrode 270 of the upper display panel 200 may respectively form first and second liquid crystal capacitors Clca and Clcb using the liquid crystal layer 3 therebetween as a dielectric material. The exemplary embodiments shown in FIG. 14 and FIG. 15 are almost equivalent to the exemplary embodiments shown in FIG. 11 and FIG. 12, and therefore no further description will be provided.

Next, a display panel of a display according to an exemplary embodiment of the present invention will be described with reference to FIG. 16 and FIG. 17. The same constituent elements as the exemplary embodiments described above are designated by like reference numerals, and thus like descriptions are omitted.

Figure 16:
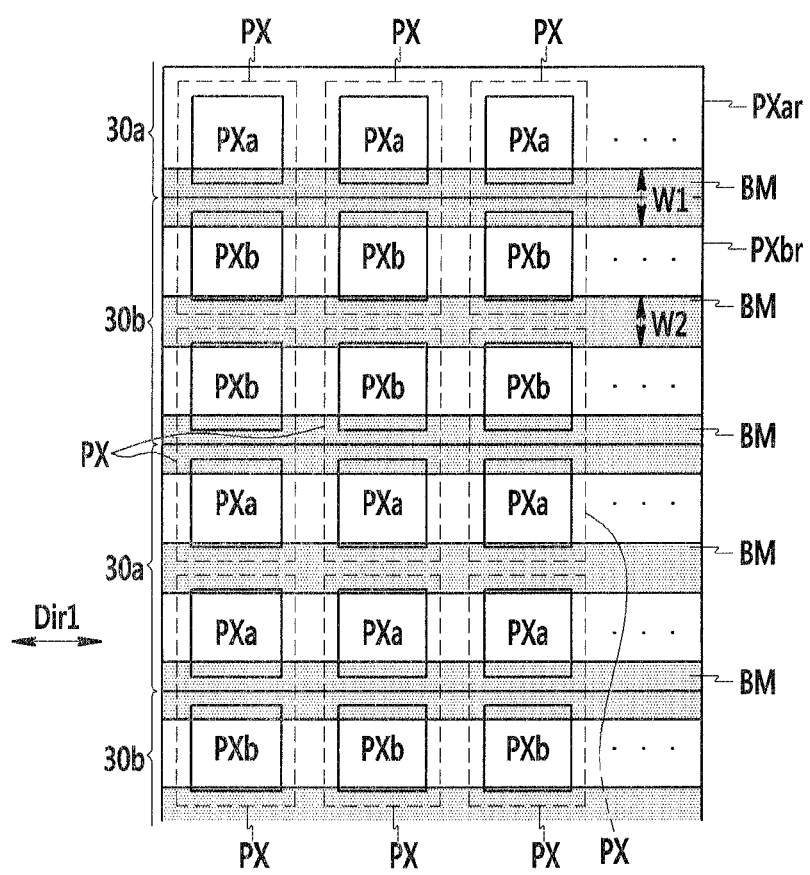
FIG. 16 and FIG. 17 respectively show top plan views of a display panel of a display device according to an exemplary embodiment of the present invention.
Figure 17:
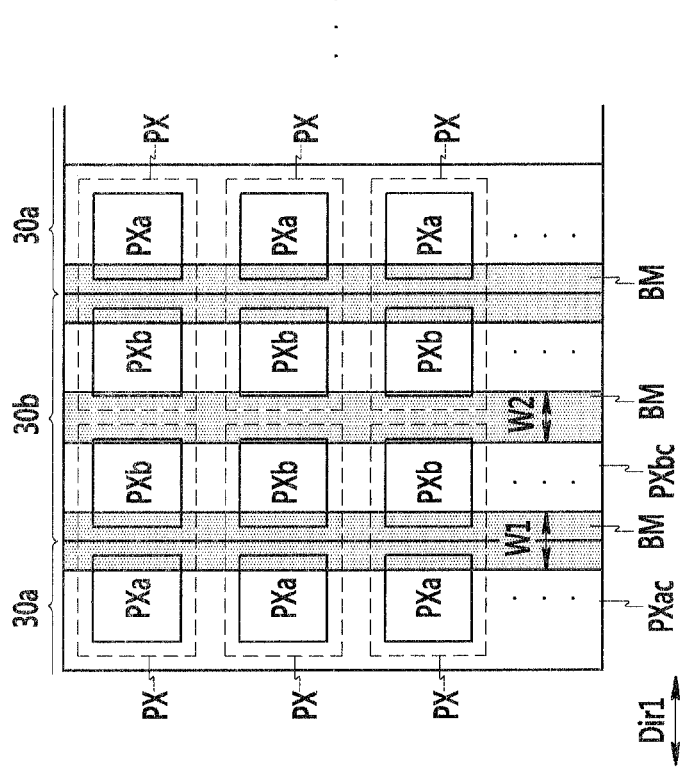

FIG. 16 and FIG. 17 respectively show top plan views of a display panel of a display according to an exemplary embodiment of the present invention.

The exemplary embodiment shown in FIG. 16 is almost equivalent to the exemplary embodiment shown in FIG. 2, except for a structure of a phase retardation film 30 and an alignment of pixels PX. In further detail, in the present exemplary embodiment, a first phase retardation portion 30a and a second phase retardation portion 30b included in the phase retardation film 30 may be disposed to overlap each other and correspond to two first sub-pixel rows PXar or two second sub-pixel rows PXbr. Thus, a pitch of the first and second phase retardation portions 30a and 30b may be approximately double a pitch of the first and second sub-pixel rows PXar and PXbr.

In the present exemplary embodiment, one first phase retardation portion 30a may correspond to two first sub-pixel rows PXar and one second phase retardation portion 30b may correspond to two second sub-pixel rows PXbr, or vice versa. For this, positions of first and second sub-pixels PXa and PXb included in pixels PX neighboring each other in a column direction may be opposite to each other. For example, as shown in FIG. 16, when a first sub-pixel PXa is disposed above a second sub-pixel PXb in a pixel PX of one pixel row, a first sub-pixel PXa may be disposed below a second sub-pixel PXb in a pixel of the next pixel row.

The exemplary embodiment shown in FIG. 17 is almost equivalent to the exemplary embodiment shown in FIG. 3, except for a structure of a phase retardation film 30 and an alignment of pixels PX. In further detail, in the present exemplary embodiment, a first phase retardation portion 30a and a second phase retardation portion 30b included in the phase retardation film 30 may be respectively disposed to correspond to two first sub-pixel columns PXac or two second sub-pixel columns PXbc. Thus, a pitch of the first and second phase retardation portions 30a and 30b may be approximately double a pitch of the first and second sub-pixel columns PXac and PXbc.

In the present exemplary embodiment, one first phase retardation portion 30a may correspond to two first sub-pixel columns PXac and one second phase retardation portion 30b may correspond to two second sub-pixel columns PXbc, or vice versa. For this, positions of first and second sub-pixels PXa and PXb included in pixels PX neighboring each other in a row direction may be opposite to each other. For example, as shown in FIG. 17, when a first sub-pixel PXa is disposed on the left side of a second sub-pixel PXb in a pixel PX of one pixel row, a first sub-pixel PXa may be disposed on the right side of a second sub-pixel PXb in a next pixel PX of the pixel row.

As shown in the exemplary embodiments of FIG. 16 and FIG. 17, first sub-pixels PXa or second sub-pixels PXb of neighboring pixels PX may neighbor each other, or two neighboring first sub-pixels PXa or two neighboring second sub-pixels PXb may be overlapped with one of the first and second phase retardation portions 30a or 30b.

In the exemplary embodiments shown in FIG. 16 and FIG. 17, all of the first sub-pixels PXa may display a right eye image and all of the second sub-pixels PXb may display a left eye image, or vise versa.

Crosstalk due to a viewing angle can be prevented by overlapping one of the first and second phase retardation portions 30a or 30b with two sub-pixel rows (PXar/PXbr) or two sub-pixel columns (PXac/PXbc).

In addition, in the exemplary embodiment shown in FIG. 16, a width W2 of a light blocking member BM disposed between two first sub-pixel rows PXar or two second sub-pixel rows PXbr corresponding to one of the first and second phase retardation portions 30a or 30b may be smaller than a width W1 of a light blocking member BM disposed between neighboring first and second phase retardation portions 30a and 30b. In the exemplary embodiment shown in FIG. 17, a width W1 of a light blocking member BM disposed between two first sub-pixel columns PXac or two second sub-pixel columns PXbc corresponding to one of the first and second phase retardation portions 30a or 30b may be smaller than a width W1 of a light blocking member BM disposed between neighboring first and second phase retardation portions 30a and 30b.

The exemplary embodiments shown in FIG. 16 and FIG. 17 may be applied to a display including the pixels PX according to the respective exemplary embodiments shown in FIG. 11 to FIG. 15.

A display panel of a display according to an exemplary embodiment of the present invention will now be described with reference to FIG. 18 and FIG. 19. The same constituent elements as the exemplary embodiments described above are designated by like reference numerals, and thus like descriptions are omitted.

Figure 18:
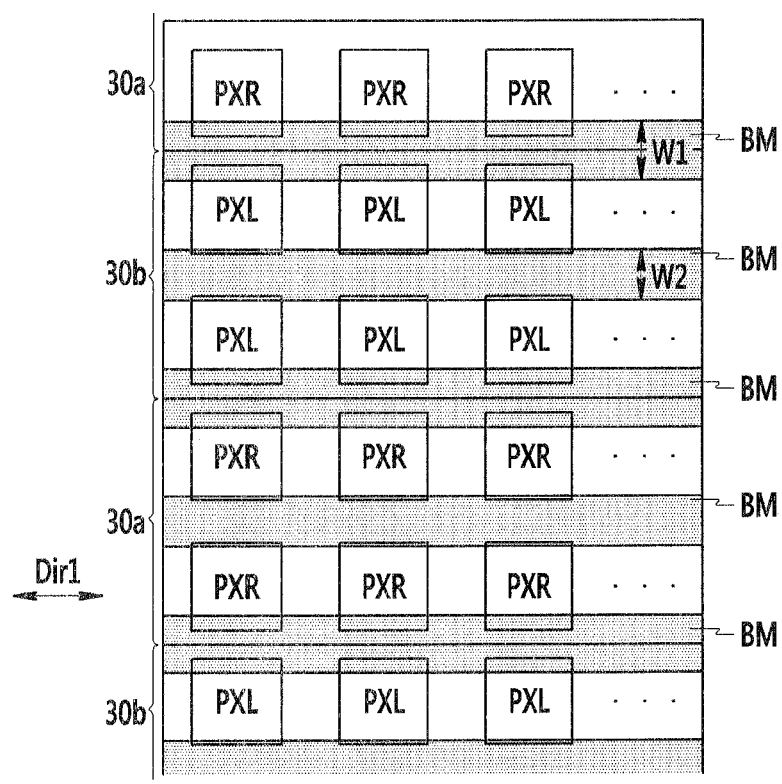
FIG. 18 and FIG. 19 respectively show top plan views of a display panel of a display device according to an exemplary embodiment of the present invention.
Figure 19:
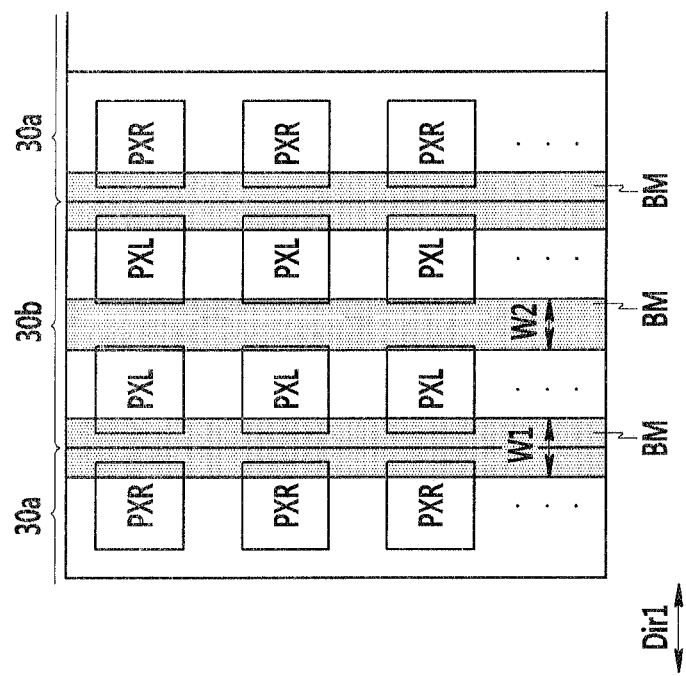

FIG. 18 and FIG. 19 respectively show top plan views of a display panel of a display according to an exemplary embodiment of the present invention.

The exemplary embodiments shown in FIG. 18 and FIG. 19 are almost equivalent to the exemplary embodiments shown in FIG. 16 and FIG. 17, except that a plurality of pixels PX include a right eye pixel. PXR for displaying a right eye image and a left eye pixel PXL for displaying a left eye image in a 3D image display mode. In a 21) image display mode, a right eye pixel PXR and a left eye pixel PXL that neighbor each other may display the same image.

Referring to FIG. 18, in one pixel row, right eye pixels PXR may be arranged in a row direction, left eye pixels PXL may be arranged in a row direction, or two neighboring right eye pixels PXR and two neighboring left eye pixels PXL may be alternately arranged in a column direction.

A first phase retardation portion 30a and a second phase retardation portion 30b included in a phase retardation film 30 may be respectively disposed to correspond to two right eye pixel PXR rows or two left eye pixel PXL rows. Thus, one first phase retardation portion 30a may correspond to two right eye pixel PXR rows and one second phase retardation portion 30b may correspond to two left eye pixels PXL rows, or vice versa.

Referring to FIG. 19, right eye pixels PXR may be arranged in a column direction, left eye pixels PXL may be arranged in a column direction, or two neighboring right eye pixels PXR in a pixel column and two neighboring left eye pixels PXL in a pixel column may be alternately arranged in a row direction.

The first phase retardation portion 30a and the second phase retardation portion 30b included in the phase retardation film 30 may be respectively disposed to correspond to two right eye pixel PXR columns or two left eye pixel PXL columns. Thus, one first phase retardation portion 30a may correspond to two right eye pixel PXR columns and one second phase retardation portion 30b may correspond to two left eye pixel PXL columns, or vice versa.

Examples of the structure of the pixels PX in the display panels shown in FIG. 18 and FIG. 19 will be described will described with reference to FIG. 20, FIG. 21, and FIG. 22. The same constituent elements as the exemplary embodiments described above are designated by like reference numerals, and thus like descriptions are omitted.

Figure 20:
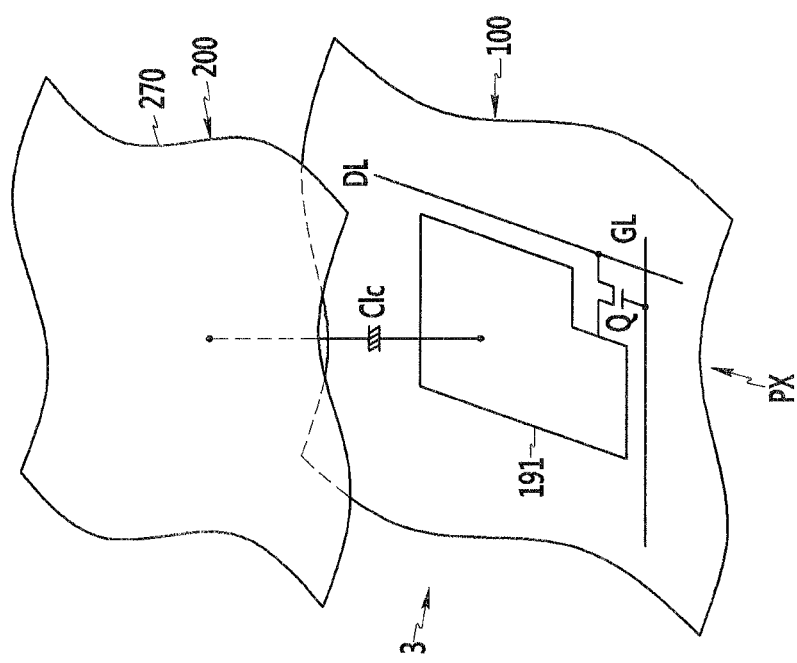
Figure 21:
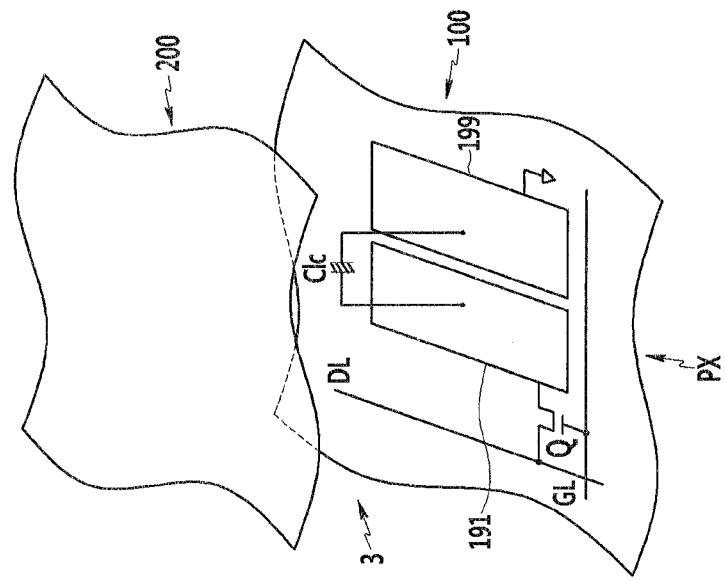

FIG. 20, FIG. 21, and FIG. 22 are equivalent circuit diagrams of display panels according to exemplary embodiments of the present invention.

First, referring to FIG. 20, a display panel according to an exemplary embodiment of the present invention includes a plurality of gate lines GL, a plurality of data lines DL, and a plurality of pixels PX connected thereto. Each pixel PX includes a switching element Q connected to a corresponding gate line GL, a corresponding data line DL and a pixel electrode 191. Further, in the case of a liquid crystal display, as shown in FIG. 20, lower and upper display panels 100 and 200 facing each other and a liquid crystal layer 3 provided therebetween may be included. The liquid crystal layer 3 may be a liquid crystal layer in a VA mode. The pixel electrode 191 may be disposed in the lower display panel 100, and an opposite electrode 270 may be disposed in the upper display panel 200. The pixel electrode 191 and the opposite electrode 270 may form a liquid crystal storage capacitor Clc using the liquid crystal layer 3 therebetween as a dielectric material.

Referring to FIG. 21, a display panel according to the present exemplary embodiment is almost equivalent to the display panel according to the exemplary embodiment shown in FIG. 20, except that a liquid crystal capacitor Clc is formed using a first electrode 191 and a second electrode 199 in a lower display panel 100 as two terminals, and a liquid crystal layer 3 disposed on the two electrodes 191 and 199 may function as a dielectric material. The first electrode 191 is connected with the switching element Q and thus receives a data voltage from the data line DL, and the second electrode 199 may receive a common voltage Vcom. Thus, an additional electrode such as an opposite electrode may not be required in the upper display panel 200. The first electrode 191 and the second electrode 199 may be formed in the shape of a bar, and may be alternately arranged in an engaged manner. The first electrode 191 and the second electrode 199 may be disposed in the same layer.

Referring to FIG. 22, a display panel according to the present exemplary embodiment is almost equivalent to the display panel according to the exemplary embodiment shown in FIG. 21, except that a pixel electrode 191 and a common electrode 137 of a lower display panel 100 become two terminals of a liquid crystal capacitor Clc, and a liquid crystal layer 3 on the two electrodes 191 and 137 functions as a dielectric material. The pixel electrode 191 is connected with a switching element Q and thus receives a data voltage, and the common electrode 137 receives a common voltage Vcom. The common electrode 137 and the pixel electrode 191 may be disposed in different layers. The pixel electrode 191 may include a plurality of branch electrodes, and the common electrode 137 may be a plane-type electrode simultaneously overlapping the plurality of branch electrodes of the pixel electrode 191.

The structure of the pixels PX of the display panel shown in FIG. 21 and FIG. 22 may be applied to the respective sub-pixels PXa and PXb of the display according to the exemplary embodiment shown in FIG. 1 to FIG. 5.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A display, comprising:
a display panel including a plurality of pixels;
a polarizer disposed on a first side of the display panel;
a phase retardation film disposed on the polarizer; and
glasses comprising a first eye glass portion and a second eye glass portion,
wherein at least one of the plurality of pixels includes a first sub-pixel and a second sub-pixel that are adjacent to each other and receive data voltages based on a same input image signal and different gamma curves from each other in a two dimensional image display mode, and
the phase retardation film includes a first phase retardation portion corresponding to the first sub-pixel and a second phase retardation portion corresponding to the second sub-pixel and adjacent to the first phase retardation portion.

2. The display of claim 1, wherein in a three dimensional (3D) image display mode, the first sub-pixel of the first pixel displays a first image recognizable through the first eye glass portion, and the second sub-pixel of the first pixel displays a second image recognizable through the second eye glass portion.

3. The display of claim 2, wherein in the 3D image display node, the first sub-pixel and the second sub-pixel respectively receive data voltages, wherein the data voltages are based on the same gamma curve and the same input image signal.

4. The display of claim 3, wherein a length of a pixel in a first direction is longer than a length of the pixel in a second direction that is perpendicular to the first direction, and the first sub-pixel and the second sub-pixel included in the pixel are arranged neighboring each other in the first direction.

5. The display of claim 4, wherein the first sub-pixels included in pixels neighboring each other in the second direction are arranged along the second direction to form a first sub-pixel column, and the second sub-pixels included in pixels neighboring each other in the second direction are arranged along the second direction to form a second sub-pixel column.

6. The display of claim 5, wherein the first sub-pixel column and the second sub-pixel column are alternately arranged along the first direction.

7. The display of claim 6, wherein the first phase retardation portion corresponds to the first sub-pixels of one first sub-pixel column, and the second phase retardation portion corresponds to the second sub-pixels of one second sub-pixel column.

8. The display of claim 7, wherein the first phase retardation portion and the second phase retardation portion respectively comprise a quarter-wave plate, and the first phase retardation portion and the second phase retardation portion change light that has passed through the polarizer to light that is circularly polarized in first and second different directions, respectively.

9. The display of claim 8, wherein the first eye glass portion transmits the light that has passed through the first phase retardation portion, and the second eye glass portion transmits the light that has passed through the second phase retardation portion.

10. The display of claim 5, wherein the first sub-pixels included in two pixel columns neighboring each other in the first direction are adjacent to each other, and the second sub-pixels included in two pixel columns neighboring each other in the first direction are adjacent to each other.

11. The display of claim 10, wherein the first phase retardation portion corresponds to the first sub-pixels included in the two pixel columns neighboring each other in the first direction, and the second phase retardation portion corresponds to the second sub-pixels included in the two pixel columns neighboring each other in the first direction.

12. The display of claim 11, wherein the first phase retardation portion and the second phase retardation portion respectively comprise a quarter-wave plate, and the first phase retardation portion and the second phase retardation portion change light that has passed through the polarizer to light that is circularly polarized in first and second different directions, respectively.

13. The display of claim 12, wherein the first eye glass portion transmits the light that has passed through the first phase retardation portion, and the second eye glass portion transmits the light that has passed through the second phase retardation portion.

14. The display of claim 1, wherein a length of a pixel in a first direction is longer than a length of the pixel in a second direction that is perpendicular to the first direction, and a first sub-pixel and a second sub-pixel included in the pixel are arranged neighboring each other in the first direction.

15. The display of claim 14, wherein the first sub-pixels included in pixels neighboring each other in the second direction are arranged along the second direction to form a first sub-pixel column, and the second sub-pixels included in pixels neighboring each other in the second direction are arranged along the second direction to form a second sub-pixel column.

16. The display of claim 15, wherein the first sub-pixel column and the second sub-pixel column are alternately arranged along the first direction.

17. The display of claim 16, wherein the first phase retardation portion corresponds to the first sub-pixels of one first sub-pixel column, and the second phase retardation portion corresponds to the second sub-pixels of one second sub-pixel column.

18. The display of claim 15, wherein the first sub-pixels included in two pixel columns neighboring each other in the first direction are adjacent to each other, and the second sub-pixels included in two pixel columns neighboring each other in the first direction are adjacent to each other.

19. The display of claim 18, wherein the first phase retardation portion corresponds to the first sub-pixels included in the two pixel columns neighboring each other in the first direction, and the second phase retardation portion corresponds to the second sub-pixels included in the two pixel columns neighboring each other in the first direction.

20. The display of claim 1, wherein the first phase retardation portion and the second phase retardation portion respectively comprise a quarter-wave plate, and the first phase retardation portion and the second phase retardation portion change light that has passed through the first polarizer to light that is circularly polarized in first and second different directions, respectively.

21. The display of claim 20, wherein the first eye glass portion transmits the light that has passed through the first phase retardation portion, and the second eye glass portion transmits the light that has passed through the second phase retardation portion.

22. A display, comprising:
a display panel including a plurality of pixels;
a polarizer disposed on a first side of the display panel;
a phase retardation film disposed on the polarizer; and
glasses comprising a first eye glass portion and a second eye glass portion,
wherein the plurality of pixels comprise a plurality of first pixels configured to display a right eye image and a plurality of second pixels configured to display a left eye image,
the plurality of first pixels form a plurality of first pixel columns respectively including pixels arranged in a first direction, two of the first pixel columns being adjacent to each other,
the plurality of second pixels form a plurality of second pixel columns respectively including pixels arranged in the first direction, two of the second pixel columns being adjacent to each other,
the two adjacent first pixel columns and the two adjacent second pixel columns are alternately arranged in a second direction perpendicular to the first direction, and
the phase retardation film comprises a first phase retardation portion corresponding to the two adjacent first pixel columns and a second phase retardation portion corresponding to the two adjacent second pixel columns.

23. The display of claim 22, wherein the first phase retardation portion and the second phase retardation portion respectively comprise a quarter-wave plate, and the first phase retardation portion and the second phase retardation portion change light that has passed through the polarizer to light that is circularly polarized in first and second different directions, respectively.

24. The display of claim 23, wherein the first eye glass portion transmits the light that has passed through the first phase retardation portion and the second eye glass portion transmits the light that has passed through the second phase retardation portion.

* * * * *